US012735216B2

(12) United States Patent
Reynard

(10) Patent No.: US 12,735,216 B2
(45) Date of Patent: Sep. 15, 2026

(54) AUTOMATIC PACKAGING SYSTEM FOR SQUEEZE TUBES IN A PACKAGE

(71) Applicant: SILEANE, Saint Etienne (FR)

(72) Inventor: Julien Reynard, Saint Etienne (FR)

(73) Assignee: SILEANE, Saint Etienne (FR)

( * ) Notice: Subject to any disclaimer, the term of this patent is extended or adjusted under 35 U.S.C. 154(b) by 27 days.

(21) Appl. No.: 18/953,353

(22) Filed: Nov. 20, 2024

(65) Prior Publication Data

US 2025/0162745 A1 May 22, 2025

(30) Foreign Application Priority Data

Nov. 21, 2023 (FR) ....................................... 2312822

(51) Int. Cl.

| | |
|---|---|
| ***B65B 35/38*** | (2006.01) |
| ***B25J 15/06*** | (2006.01) |
| ***B65B 5/06*** | (2006.01) |
| ***B65B 5/08*** | (2006.01) |

(52) U.S. Cl.

CPC ........... *B65B 35/38* (2013.01); *B25J 15/0616* (2013.01); *B65B 5/068* (2013.01); *B65B 5/08* (2013.01)

(58) Field of Classification Search

USPC ............................................................ 53/147

See application file for complete search history.

(56) References Cited

U.S. PATENT DOCUMENTS

2014/0260113 A1* 9/2014 Thompson ........... B25J 15/0061 53/247
2023/0182313 A1 6/2023 Nielsen et al.

FOREIGN PATENT DOCUMENTS

| | | |
|---|---|---|
| FR | 1 495 501 | 9/1967 |
| FR | 3 107 265 | 8/2021 |
| JP | S55 71207 | 5/1980 |

OTHER PUBLICATIONS

Search Report dated Jun. 28, 2024.

* cited by examiner

*Primary Examiner* — Chinyere J Rushing-Tucker
(74) *Attorney, Agent, or Firm* — IPSILON USA, LLP

(57) ABSTRACT

A facility (1) for automatic packaging of squeeze tubes (2) in a package (3), has at least one unit with at least one first polyarticulated system (5) having a gripper coupled with a single gripping tool (6) provided with at least one suction cup (17) and configured to grip, one by one, and in association with a first viewing system (7), tubes (2) and depositing them flat, in association with a second viewing system (8), on an intermediate plate (9). At least one intermediate plate (9) has at least one row (12) of wedges adjusted to the shape of the tubes (2) and laterally attached to one another to support the tubes (2) flat side by side and in the same direction. At least one second polyarticulated system (10) has a gripper coupled with a simultaneous gripping tool (11) provided with a row (16) of suction cups and configured to simultaneously grip all of the tubes (2) from the intermediate plate (9) and package them flat in a package (3).

10 Claims, 12 Drawing Sheets

[Fig. 1]
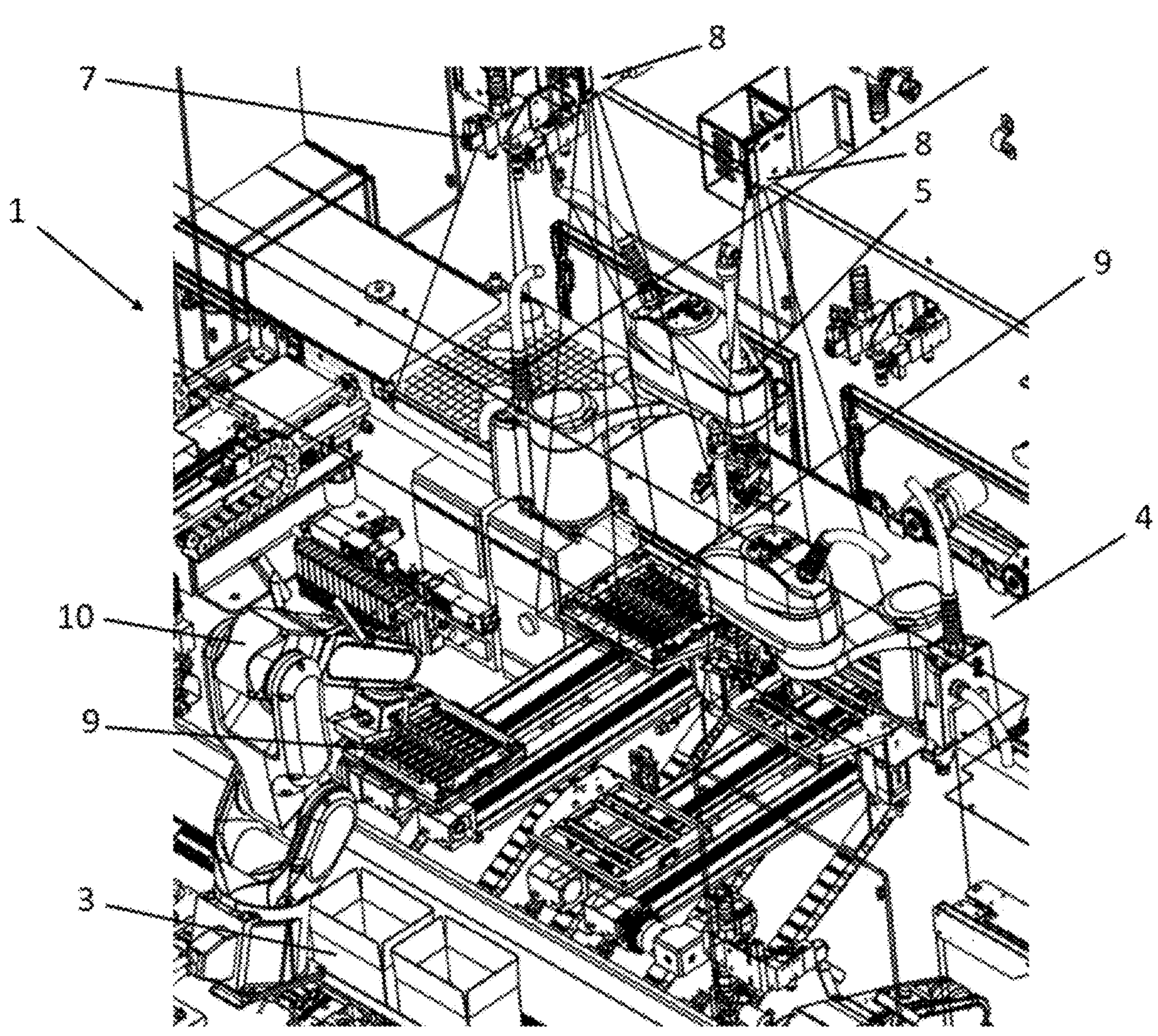

[Fig. 2]
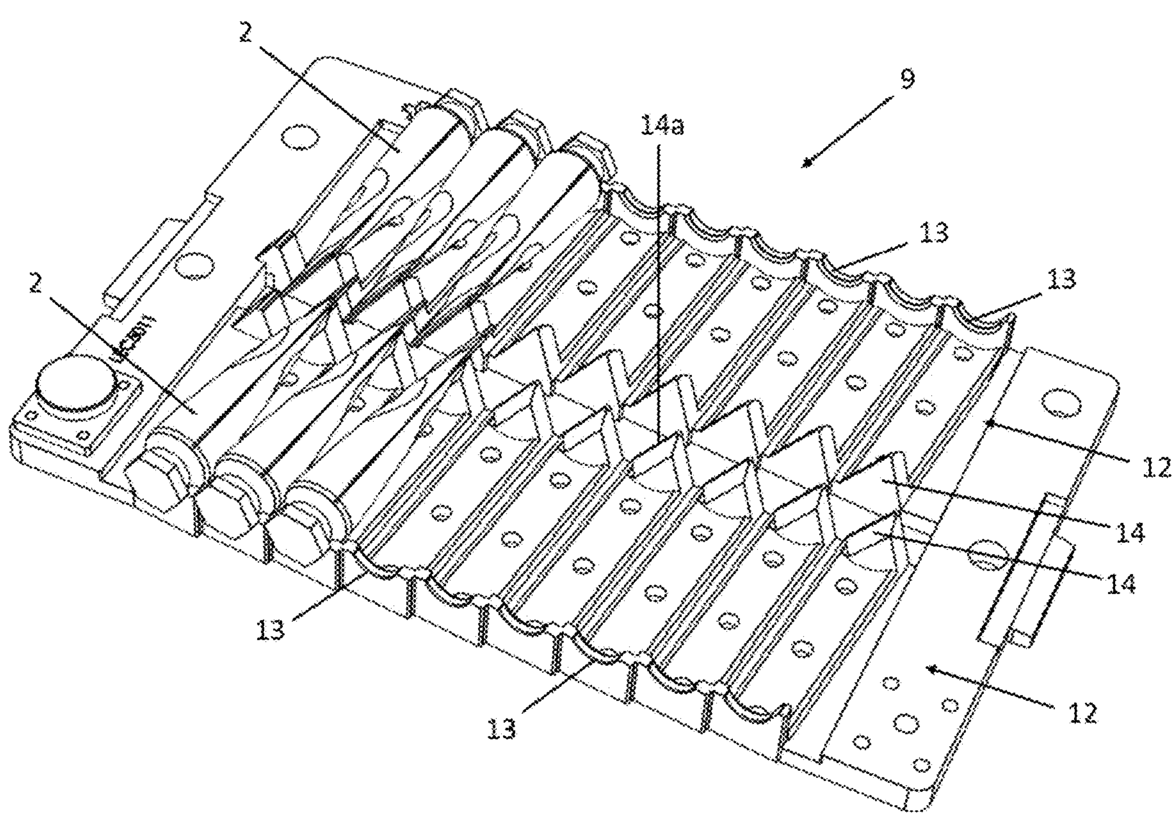

[Fig. 3]
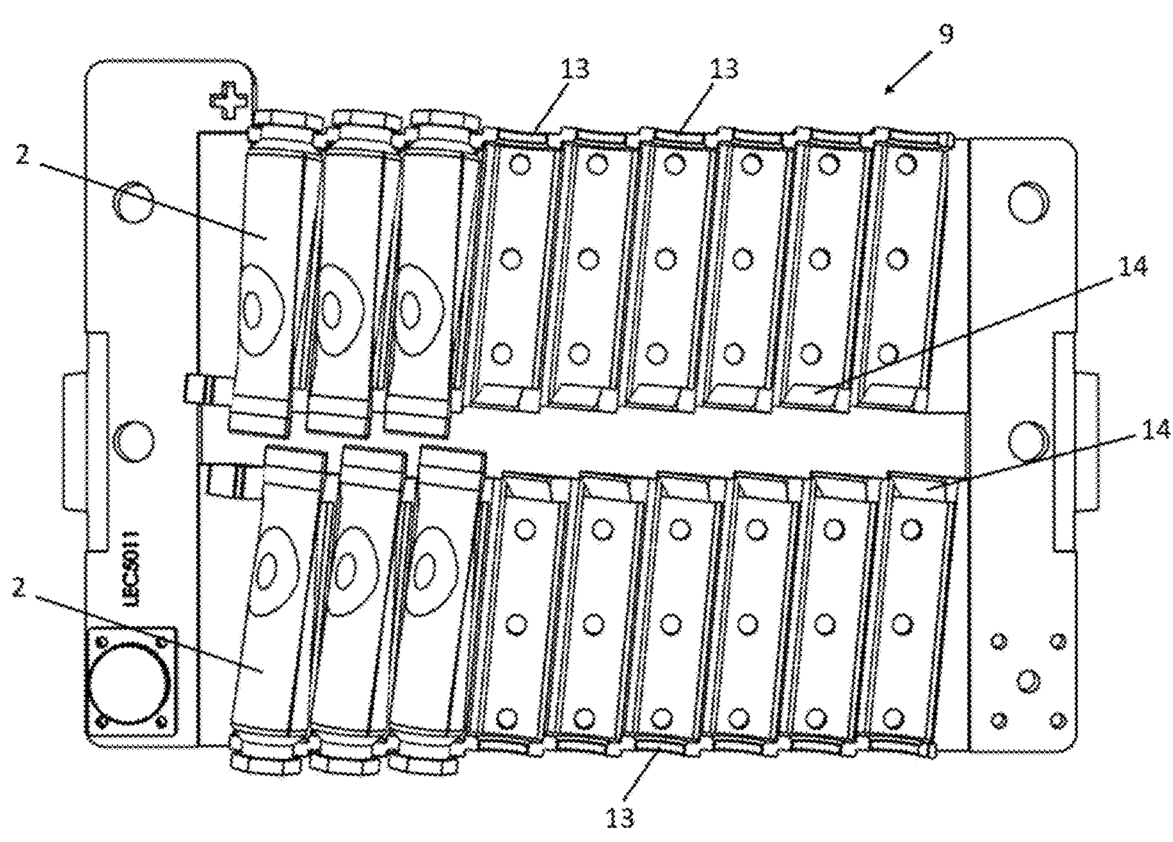

[Fig. 4]
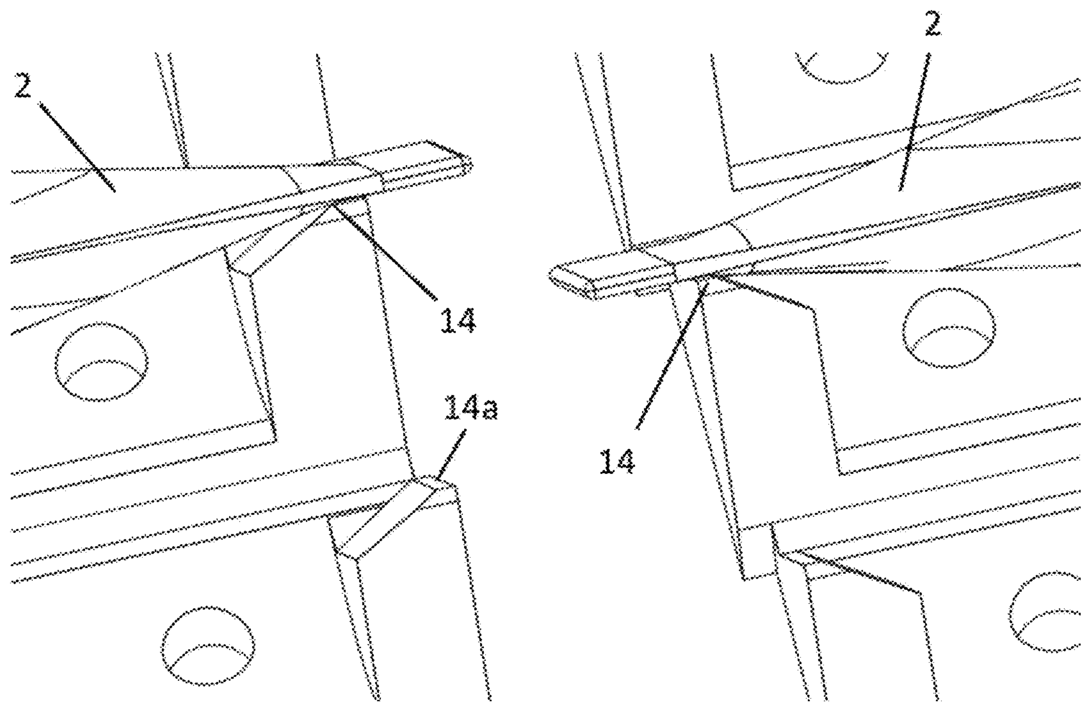

[Fig. 5]
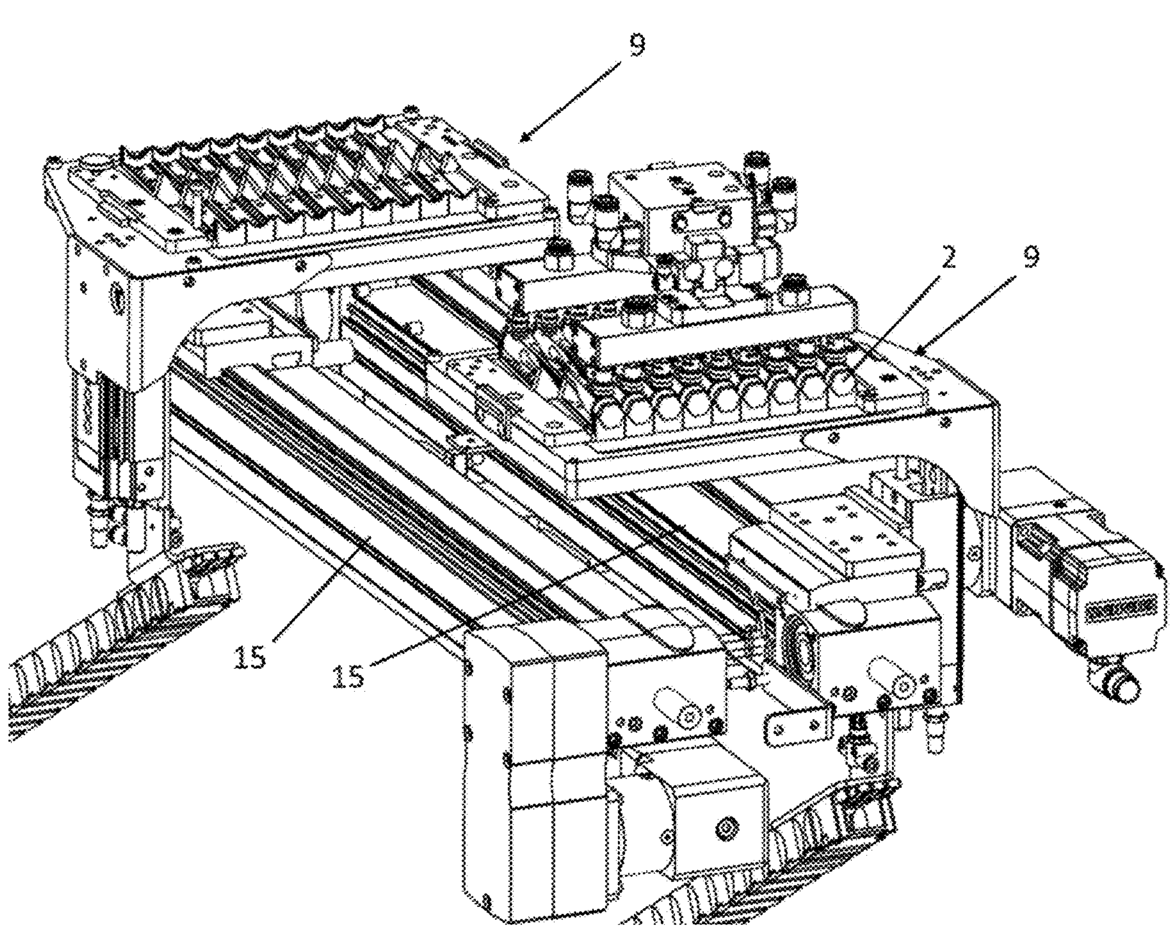

[Fig. 6]
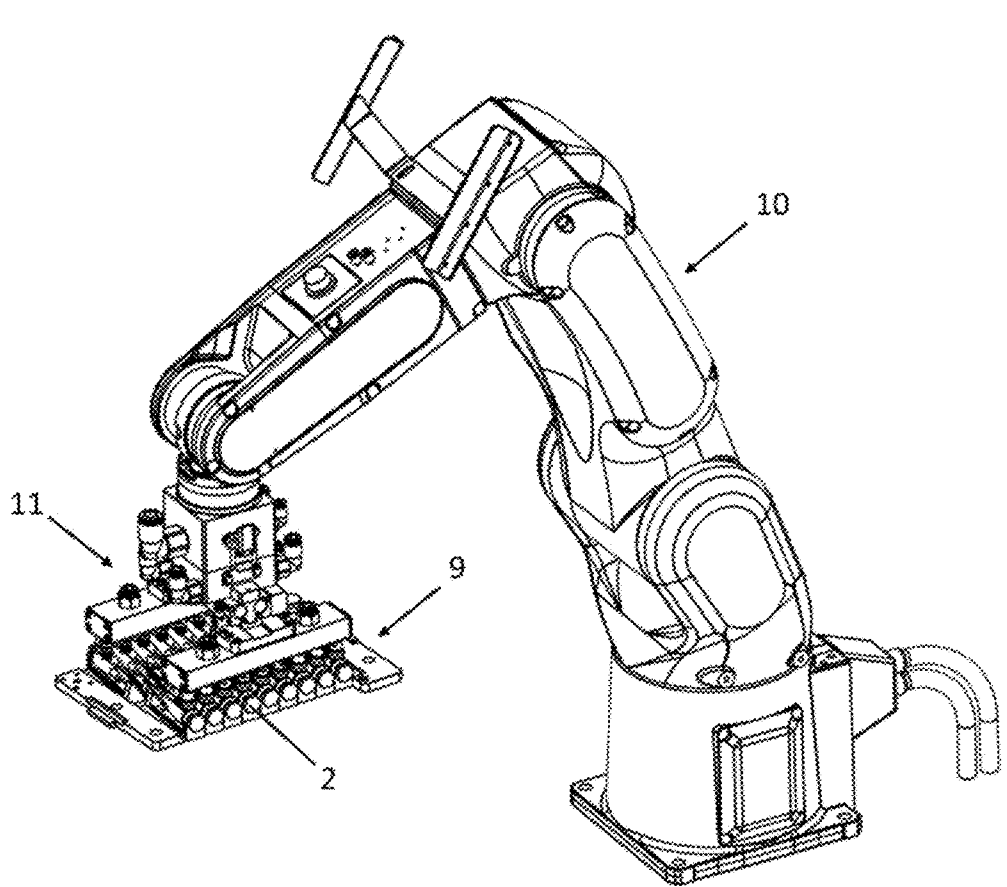

[Fig. 7]
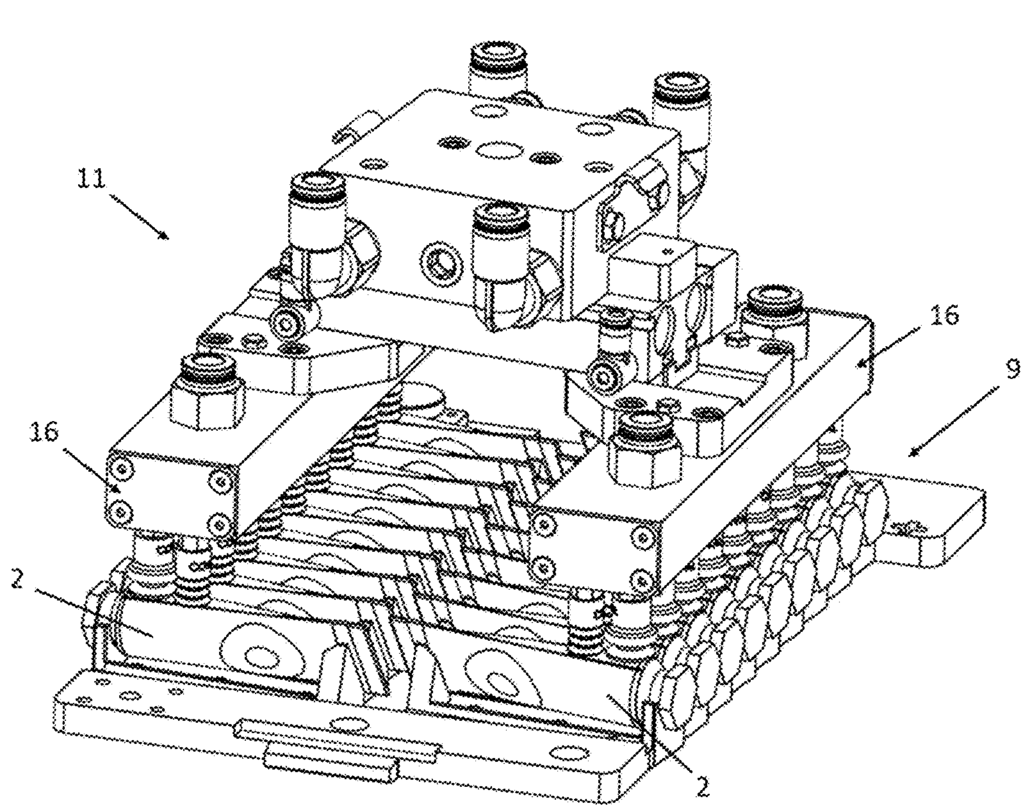

[Fig. 9]
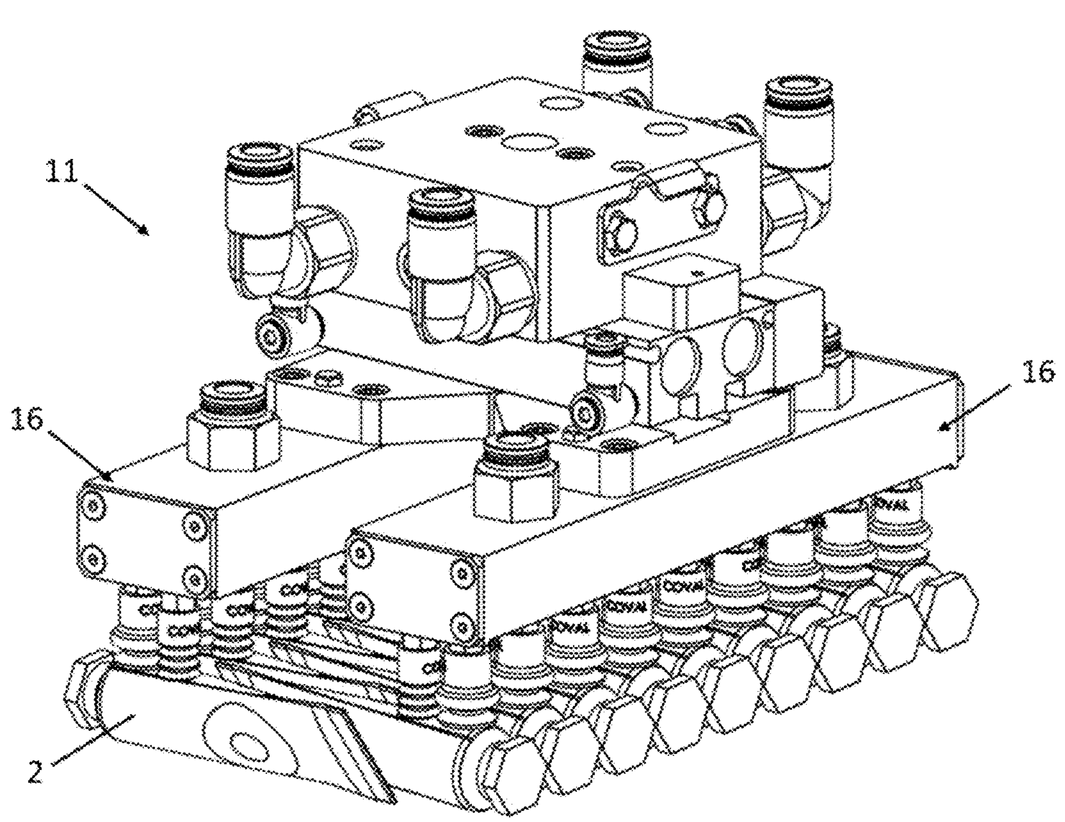
[Fig. 10]
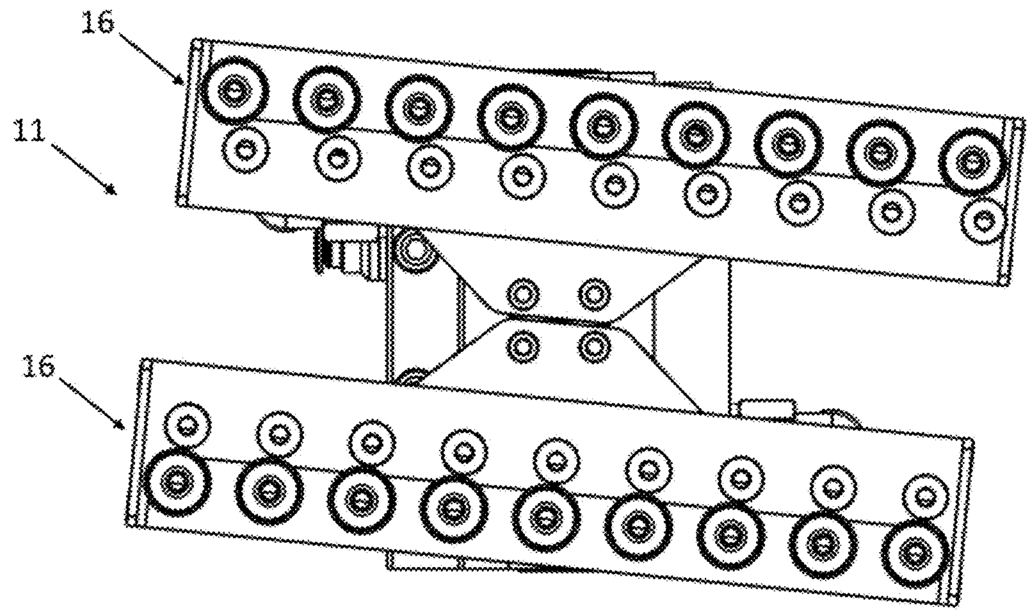

[Fig. 11]
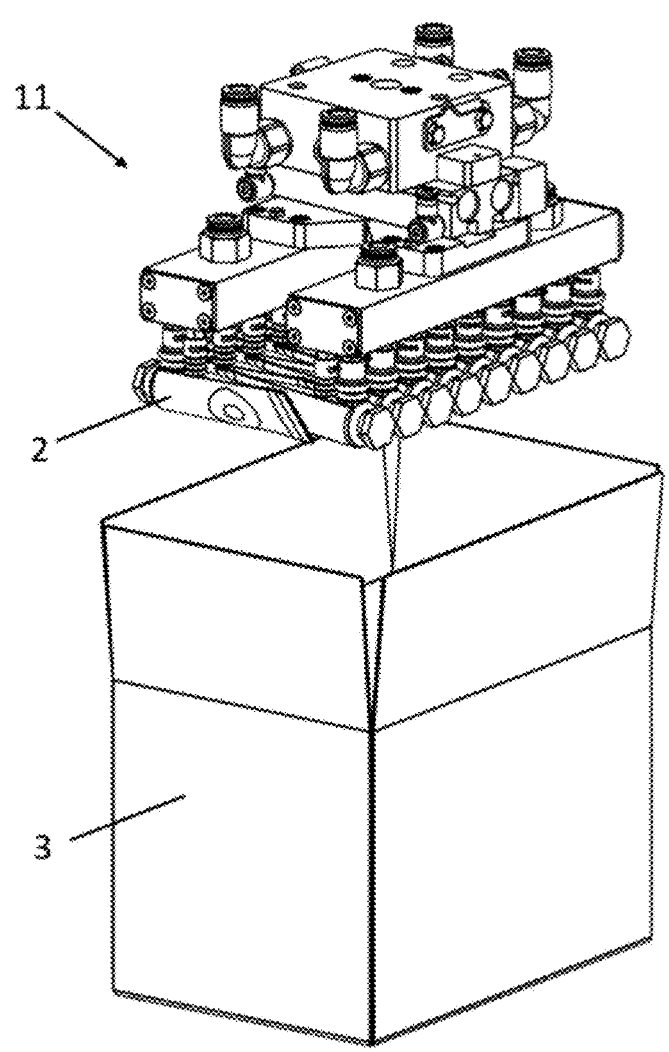

[Fig. 12]
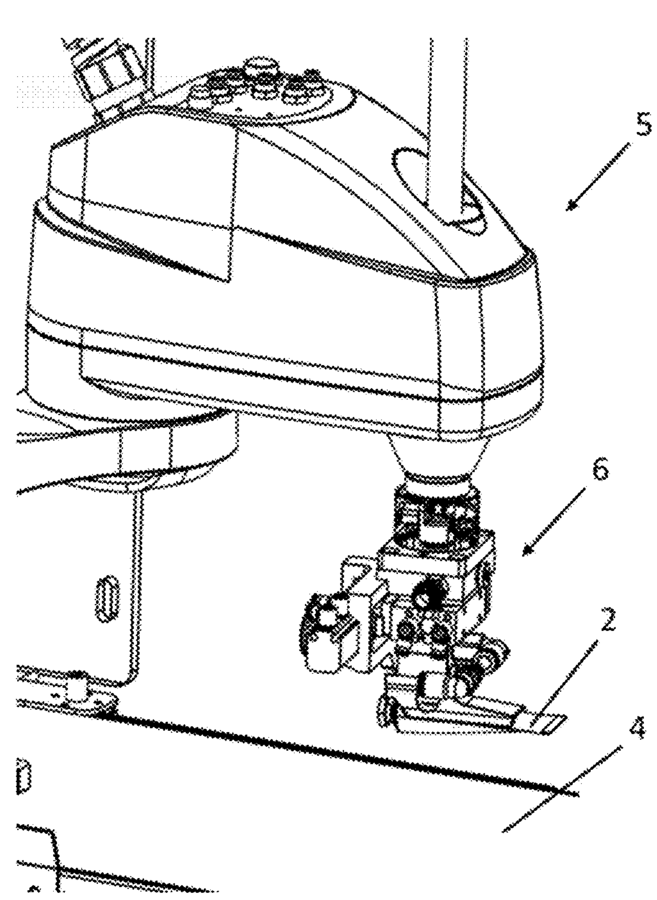

[Fig. 13]
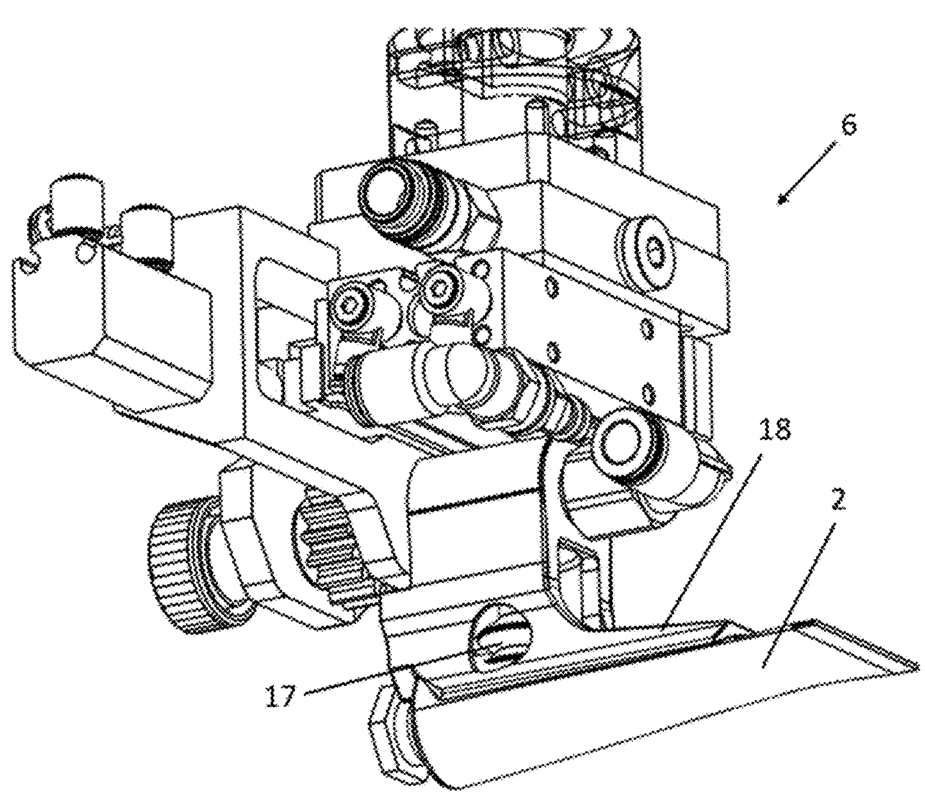

AUTOMATIC PACKAGING SYSTEM FOR SQUEEZE TUBES IN A PACKAGE

RELATED APPLICATION

This application claims the benefit of priority from French Patent Application No. 23 12822, filed on Nov. 21, 2023, the entirety of which is incorporated by reference.

TECHNICAL FIELD

The invention relates to the technical field of automatic packaging for squeeze tubes, for example, cosmetic tubes, in packages, for example, cardboard boxes.

By squeeze tubes, this means the type of deformable tube to be pressed to deliver its content, generally used in cosmetics and known as a "squeeze tube".

This type of tube comprises a tubular body made of a flexible material, and having a first open end provided with a dispensing head, and a second end, closed by a weld seam. The assembly defines an inner volume intended to contain a product, for example, cosmetic product. The dispensing head conventionally has a neck on which a stopper is fastened. The second end is generally closed after filling with the product, by clamping said tubular partition and welding.

PRIOR ART

It is known from the prior art, to automatically package squeeze tubes in a cardboard box, with each tube in the vertical position.

The packaging is done by polyarticulated systems, configured to grip the tubes in a linear bulk and deposit them vertically in a box, the tubes being separated and held by spiders.

However, it appears that the speed of execution and the bulk of the packaging of the tubes could be widely improved.

SUMMARY OF THE INVENTION

One of the aims of the invention is to provide a facility for automatic packaging of squeeze tubes in a package, in particular parallelepiped-shaped, which makes it possible to optimise the speed of execution and the bulk of the packaging.

To this end, an facility for automatic packaging of squeeze tubes in a package has been developed, noteworthy in that it comprises at least one unit comprising:

- at least one first polyarticulated system comprising a gripper coupled with a single gripping tool provided with at least one suction cup and configured to grip, one by one, and in association with a first viewing system, tubes and depositing them flat, in association with a second viewing system, on an intermediate plate;
- at least one intermediate plate comprising at least one row of wedges adjusted to the shape of the tubes and laterally attached to one another to support the tubes flat side by side and in the same direction;
- at least one second polyarticulated system comprising a gripper coupled with a simultaneous gripping tool provided with a row of suction cups and configured to simultaneously grip all of the tubes from the intermediate plate and package them flat in a package.

Under these conditions, the tubes are henceforth packaged flat in the package, such that the bulk is very clearly reduced, with an optimised speed of execution.

According to a particular embodiment, the row of suction cups of the simultaneous gripping tool comprises pairs of suction cups, thus improving the gripping effectiveness of the polyarticulated system.

Advantageously, the plate comprises at least two rows of parallel wedges, intended to support the tubes in opposite directions against one another and in staggered manner, and the simultaneous gripping tool comprises two parallel rows of suction cups, which can be moved closer to one another.

In this manner, when the second polyarticulated system grips all of the tubes to package them flat in the package, the rows of suction cups are moved closer to one another to engage the tubes of one row between the tubes of another row, in order to very clearly decrease the bulk. In practice, the packaging flat makes it possible to reduce the bulk by a factor of three.

According to a particular embodiment, the plate comprises at least two wedges per tube, in particular one for each tube, namely a first wedge with an indentation, for example semi-circular or V-shaped or any other suitable shape, to receive the neck of the tube, and a second wedge with an inclined slope to bearingly receive an opposite end of the tube.

In this manner, each tube is held optimally and precisely to facilitate the simultaneous gripping operation. The inclined slope makes it possible to hold each tube with an inclination of its welded end, such that after packaging in the package, the ends of the tubes partially overlap one another, which is commonly called tiling packaging.

According to a particular embodiment, the wedges are oriented so as to receive the tubes on the plate, incliningly with respect to the row of wedges, about an angle of between 80° and 90°, preferably 85°. Naturally, these values depend on the number of tubes to be packaged with respect to a given length of the package.

These values make it possible to optimise the bulk and to decrease the risk of conflict between the tubes when the rows of suction cups are moved closer to one another.

In order to further optimise the bulk of the tubes packaged flat, by tiling, the slope of the second wedge is inclined with respect to the plane of the plate by an angle of between 50° and 60°, for example, 55°.

In order to prevent the positioning defect of a tube to ensure the stability of the tubes positioned between the wedges, the slope of the second wedge has a chamfered internal portion, in particular to fit the body of the tube.

In order to increase the packaging rates, the unit comprises at least two intermediate plates, each positioned in the field of action of a polyarticulated system, and movable alternatively between the first and the second polyarticulated system.

In this configuration, this makes it possible to do work in masked time. In particular, when the second polyarticulated system simultaneously grips all of the tubes from one of the plates to package them in the package, the first polyarticulated system deposit new tubes on the other plate.

Preferably, the suction cup of the single gripping tool pivots about a vertical axis and about a horizontal axis.

Under these conditions, this makes it possible to facilitate the orientation of the tubes, particularly when this relates to depositing them on a plate with two rows, i.e. with one row of tubes in one direction and one row of tubes in an opposite direction.

According to a particular embodiment, the suction cup of this single gripping tool is mounted in a shoe intended to cap the tube when it is gripped.

In this manner, the gripping operation is stable, the shoe acts as a template which sets the position of the tube, in order to facilitate its placement on the plate.

BRIEF DESCRIPTION OF THE DRAWINGS

FIG. 1 is a perspective, schematic representation of a packaging facility according to the invention.

FIG. 2 is a perspective view of a plate comprising two rows of wedges to receive tubes, with some tubes positioned on it.

FIG. 3 is a view similar to that of FIG. 2, as a top view.

FIG. 4 is a detailed view on the wedges intended to support the welded ends of the tubes.

FIG. 5 is a perspective view of the arrangement of two intermediate plates which are movable alternatively between the polyarticulated systems.

FIG. 6 is a view of the second polyarticulated system, ready to simultaneous grip all of the tubes from an intermediate plate.

FIG. 7 is a view similar to that of FIG. 6, perspectively illustrating the simultaneous gripping tool, simultaneously gripping all of the tubes.

Figure 8:
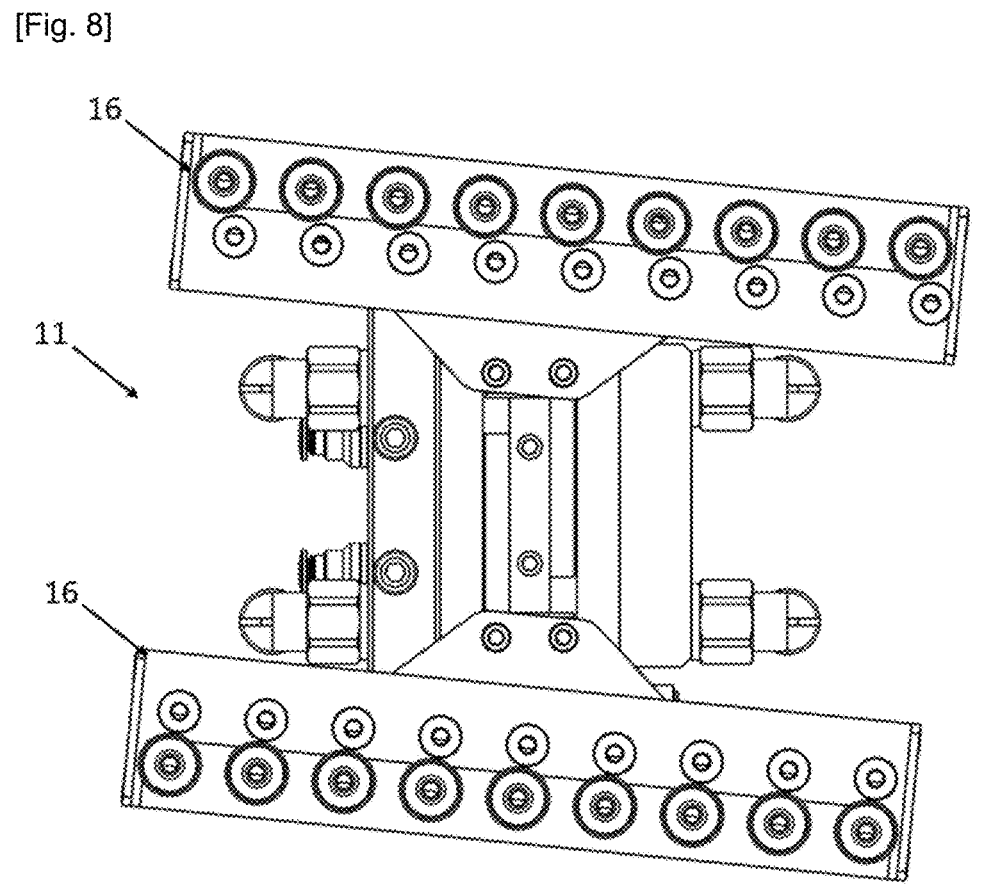

FIG. 8 is a bottom view of the simultaneous gripping tool, illustrating the rows of suction cups moved away from one another.

FIG. 9 is a view similar to that of FIG. 7, the rows of suction cups being moved closer to one another to decrease the bulk of the packaging of the tubes, and to achieve the staggered tiling.

FIG. 10 is a view similar to that of FIG. 8, the rows of suction cups being moved closer to one another.

FIG. 11 is a view of the simultaneous gripping tool during the deposition of the tubes flat in a package.

FIG. 12 perspectively illustrates the first polyarticulated system gripping a tube.

FIG. 13 is a perspective view of the single gripping tool gripping a tube.

DETAILED DESCRIPTION OF THE INVENTION

In reference to FIGS. 1 to 13, the invention relates to a facility (1) for automatic packaging of squeeze tubes (2) in a package (3), in particular by tiling, i.e. that the tubes (2) are positioned flat and partially overlap one another, as can be seen in the figures.

In practice, the tubes (2) are presented and oriented randomly in a linear bulk and fed through the facility (1) by at least one conveyor (4), with the aim of automatically gripping them, one by one, in view of them being packaged in the package (3).

To this end, the facility (1) comprises at least one unit, and preferably a plurality of units positioned following one another and in front of which the conveyor (4) feeds the linear bulk of tubes (2).

Each unit comprises a first polyarticulated system (5) comprising a gripper coupled with a single gripping tool (6) configured to grip, one by one and in association with a first viewing system (7), tubes (2) on the conveyor (4) to then deposit them flat, in association with a second viewing system (8), on an intermediate plate (9).

The unit also comprises a second polyarticulated system (10) comprising a gripper coupled with a simultaneous gripping tool (11) configured to simultaneously grip all of the tubes (2) disposed on the intermediate plate (9), and to package them flat in the package (3).

To do this, and in a known manner, the facility (1) comprises a control unit (not represented) which executes a computer program, programmed to define, in association with the viewing systems (7, 8), gripping zones on the tubes (2) and deposition zones on the plate (9), and program to send corresponding operating instructions to the polyarticulated system.

In reference to FIGS. 2 to 4, the intermediate plate (9) comprises at least one row (12) of wedges (13, 14), and preferably two parallel rows (12), with wedges fitted to the shape of the tubes (2) and laterally attached to one another to support the tubes (2) flat and side by side. The rows of wedges support the tubes (2) in opposite directions and in staggered manner.

In practice, the plate (9) comprises two wedges per tube, namely a first wedge (13) with, for example, a semi-circular indentation, to receive the neck of the tube, and a second opposite wedge (14), with an inclined slope (**14*a***) to bearingly receive an opposite end of the tube.

In reference to FIG. 3, the wedges (13, 14) are oriented to receive the tubes (2) on the plate (9), incliningly with respect to the row (12) of wedges, and about an angle of between 80° and 90°, preferably 85°.

In reference to FIG. 2, the slope (**14*a*) of the second wedge is inclined with respect to the plane of the plate (9**) by an angle of between 50° and 60°, for example, 55°.

In reference to FIG. 4, the slope (**14*a***) of the second wedge has a chamfered internal portion in order to best fit the shape of the tube to be supported.

In reference to FIG. 5, each unit preferably comprises two intermediate plates (9), each positioned in the field of action of one of the polyarticulated systems, movable alternatively between the first and the second polyarticulated system (5, 10).

The plates (9) are, for example, each slidingly mounted on a rail (15), the two rails (15) being side by side and parallel to one another, and the plate (9) being, for example, offset to slide along one same axis at different levels to be able to move from one position to another, without conflict.

This design makes it possible for the two polyarticulated systems (5, 10) to do work in masked time, when the first polyarticulated system (5) deposits the tubes (2) one by one on the plate (9), the second polyarticulated system (10) grips all of the tubes (2) from the second plate (9) to package them in the package (3).

In reference to FIGS. 7 to 11, the simultaneous gripping tool (11) of the second polyarticulated system (10) is provided with at least one row of suction cups (16), and with two rows of suction cups (16) when the plate (9) comprises two rows (12) of wedges. The rows of suction cups (16) are therefore complementary to the rows (12) of wedges of the plate (9), the suction cups being spaced apart from one another by a distance corresponding to the distance between the tubes (2) lying on the plate (9). Preferably, and in order to maximise the gripping operation, the row of suction cups (16) comprises pairs of suction cups.

The two parallel rows (16) of suction cups can be moved closer to one another by any suitable means, for example, by means of slider connections.

In this manner, after having simultaneously gripped all of the tubes (2) disposed flat on the plate (9), the second polyarticulated system (10) is controlled to move the rows of suction cups (16) closer to one another so as to engage the tubes (2) of a row with the tubes (2) of the other row to perform a staggered tiling of the tubes (2).

Then, all of the tubes (2) moved closer to one another are disposed flat in a cardboard package (3), for example.

Preferably, a cardboard sheet is then placed on this tube plane, to receive another one of them, and so on until the box is filled.

Once the box is filled, it is discharged and closed, and a new, empty box is positioned.

In reference to FIGS. 12 and 13, the single gripping tool (6) of the first polyarticulated system (5) preferably comprises at least one suction cup (17), which can pivot about a vertical axis and about a horizontal axis, according to any suitable technique, well-known to a person skilled in the art, for example through a pinion pivotingly secured to the suction cup (17), mounted on a rack which can be moved by an actuator to make the suction cup pivot.

In this manner, the second polyarticulated system (10) can easily deposit in one direction, then in another direction, the different tubes (2) on the wedges of the two rows of the plate (9).

According to a particular embodiment, the suction cup (17) of the single gripping tool (6) is mounted in a shoe (18), which has an indentation which is complementary to that of a tube positioned flat and intended to cap the tube when it is gripped, in order to correctly set the position of the tube for a perfect deposition on the plate (9).

It emerges from the above that the facility (1) of the invention makes it possible to produce an automatic packaging, in particular by tiling flat, for squeeze tubes (2) with an optimised bulk and speed of execution.

The invention claimed is:

1. A facility for automatic packaging of squeeze tubes in a package, has at least one unit comprising:

at least one first polyarticulated system comprising a gripper coupled with a single gripping tool provided with at least one suction cup and configured to grip, one by one, and in association with a first viewing system, tubes and depositing them flat, in association with a second viewing system, on at least one intermediate plate;

said at least one intermediate plate comprising at least one row of wedges adjusted to the shape of the tubes and laterally attached to one another to support the tubes flat side by side and in the same direction; and at least one second polyarticulated system comprising a gripper coupled with a simultaneous gripping tool provided with a row of suction cups and configured to simultaneously grip all of the tubes from the at least one intermediate plate and package them flat in a package.

2. The facility according to claim 1, wherein the row of suction cups comprises pairs of suction cups.

3. The facility according to claim 1, wherein the at least one intermediate plate comprises at least two rows of parallel wedges, intended to support the tubes in opposite directions against one another and in staggered manner, and the simultaneous gripping tool comprises two parallel rows of suction cups, which can be moved closer to one another.

4. The facility according to claim 1, wherein the at least one intermediate plate comprises two wedges per tube, one for each end, namely a first wedge with an indentation to receive the neck of the tube, and a second wedge with an inclined slope to bearingly receive an opposite end of the tube.

5. The facility according to claim 4, wherein the two wedges are oriented to receive the tubes on the at least one intermediate plate, inclining with respect to the row of wedges, about an angle of between 80° and 90°.

6. The facility according to claim 4, wherein the slope of a second wedge of said two wedges is inclined with respect to the plane of the at least one intermediate plate by an angle of between 50° and 60°.

7. The facility according to claim 4, wherein the slope of a second wedge of said two wedges has a chamfered internal portion.

8. The facility according to claim 1, wherein the unit comprises at least two intermediate plates, each positioned in the field of action of one of the at least one first or at least one second polyarticulated systems, and movable alternatively between the at least one first, and the at least one second, polyarticulated system.

9. The facility according to claim 1, wherein the suction cup of the single gripping tool pivots about a vertical axis and about a horizontal axis.

10. The facility according to claim 9, wherein the suction cup is mounted in a shoe intended to cap the tube when it is gripped.

* * * * *